United States Patent
Rose et al.

(10) Patent No.: US 6,702,318 B2
(45) Date of Patent: Mar. 9, 2004

(54) VEHICLE OCCUPANT RESTRAINT MODULE WITH DISK INFLATOR

(75) Inventors: Larry D. Rose, So. Weber, UT (US); Marc D. Folsom, Salt Lake City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/829,688

(22) Filed: Apr. 11, 2001

(65) Prior Publication Data

US 2002/0149177 A1 Oct. 17, 2002

(51) Int. Cl.[7] .............................................. B60R 21/16
(52) U.S. Cl. .................... 280/728.2; 280/736; 280/740; 280/741; 280/742
(58) Field of Search .............................. 280/728.2, 736, 280/740, 741, 743.1, 743.2, 742

(56) References Cited

U.S. PATENT DOCUMENTS

| | | | | |
|---|---|---|---|---|
| 4,988,119 A | * | 1/1991 | Hartmeyer ................... 141/313 |
| 5,505,483 A | * | 4/1996 | Taguchi et al. ........... 280/728.2 |
| 5,511,818 A | * | 4/1996 | Jarboe et al. ............. 280/728.2 |
| 5,518,266 A | | 5/1996 | O'Docherty et al. |
| 5,673,930 A | * | 10/1997 | Coleman ................... 280/728.1 |
| 5,678,848 A | * | 10/1997 | Soderquist ............... 280/728.2 |
| 5,697,637 A | | 12/1997 | Milne, III |
| 5,836,608 A | * | 11/1998 | Soderquist et al. ...... 280/728.2 |
| 5,860,672 A | * | 1/1999 | Petersen ................... 280/728.2 |
| 5,992,874 A | * | 11/1999 | Sugiyama et al. ....... 280/728.2 |
| 6,017,054 A | * | 1/2000 | Magoteaux ............... 280/728.2 |
| 6,042,147 A | * | 3/2000 | Nishijima et al. .......... 280/731 |
| 6,120,056 A | * | 9/2000 | Ryan et al. ............... 280/728.2 |
| 6,149,184 A | * | 11/2000 | Ennis et al. ............. 280/728.2 |
| 6,149,192 A | * | 11/2000 | Swann et al. ................ 280/740 |
| 6,155,599 A | | 12/2000 | Bowers et al. |
| 6,364,342 B1 | * | 4/2002 | Kim ........................ 280/728.2 |

FOREIGN PATENT DOCUMENTS

| | | | | |
|---|---|---|---|---|
| JP | 117611 | * | 5/1995 | .............. 280/728.2 |
| JP | 47957 | * | 2/2001 | .............. 280/728.2 |

* cited by examiner

Primary Examiner—Paul N. Dickson
Assistant Examiner—Toan C To
(74) Attorney, Agent, or Firm—James D. Erickson; Sally J. Brown

(57) ABSTRACT

A novel vehicle occupant restraining module is described. The retraining module includes an inflatable cushion having an inner surface and an outer surface. The inflatable cushion is capable of receiving inflation fluid from an inflation fluid source. A retaining collar is positioned adjacent a mouth of the cushion and about the inflation fluid source to retain the inflatable cushion in communication with the inflation fluid source. The retaining collar includes a flange that flares elliptically outward from the inflation fluid source. The retaining collar also includes an extension tab for preventing the cushion from contacting the inflation fluid source after inflation.

47 Claims, 4 Drawing Sheets

VEHICLE OCCUPANT RESTRAINT MODULE WITH DISK INFLATOR

BACKGROUND

1. The Field of the Invention

The present invention is related to a vehicle occupant restraint module. More particularly, the present invention is related to a novel airbag cushion restraint module with a unique collar for retaining the cushion in communication with a disk-shaped inflator.

2. Technical Background

Inflatable vehicle occupant safety restraint modules, or "airbag modules," are mandatory on most new vehicles. Airbag modules commonly contain a collision sensor, an inflator, and an airbag cushion. In the event of an accident, a collision sensor such as an accelerometer, measures abnormal deceleration and triggers the inflator by means of an electronic signal. The inflator is a pyrotechnic device which produces gas or other inflation fluid. It is connected to the airbag cushion which is typically housed in the steering wheel on the driver's side of a vehicle and in the dashboard on the passenger side of a vehicle. Airbag cushions are housed in an uninflated and folded condition to minimize space requirements. Upon receipt of the signal from the collision sensor, the inflator rapidly produces a quantity of inflation fluid or gas which inflates the cushion and protects the passenger from harmful impact with the interior of the car.

Most known passenger inflators are cylindrical and are mounted in a safety restraint module that is transverse to the vehicle occupant. These inflators require significant housing structures to support the inflator. They also require conduit or channeling structures to direct the inflation fluid from the inflator into the airbag cushion which is typically mounted separately and some distance from the inflator. The housing and conduit structures of these prior art cylindrical inflators are complex in their design, and are larger, heavier, and more costly to manufacture and install.

In response to these problems, smaller "disc style" inflators have been used. However, these inflators also suffer many disadvantages. Many disc style inflators are inappropriate for use on the passenger side of the vehicle because they lack the power to inflate the airbag cushion to adequately fill the space on the passenger side of the vehicle where there is no steering wheel. Other disc inflators have complex channeling designs for funnelling inflation fluid into the cushion. This adds to the complexity of the manufacturing process and also to the size and weight of the airbag module. These complex disk inflators are difficult to install.

Still other disk style inflators channel inflation fluid to small openings around the inflator which decreases the speed of inflation making the airbag restraint less effective on the passenger side of the vehicle. Still other disk inflators to not provide for even inflation of the airbag which can create unequal inflation forces causing the airbag cushion to be out of position upon inflation.

One problem with known airbag occupant restraint modules is that the inflation fluid source or inflator becomes very hot upon inflation of the airbag. Once the airbag has deployed and performed its purpose, airbag cushions ultimately collapse, and can come into contact with the inflator. This can damage the cushion or create harmful fumes as the cushion starts to burn.

Accordingly, a need exists for an airbag restraint module with a simplified, smaller, and lighter weight design that can also fully inflate an airbag cushion on the passenger side of the vehicle. Additionally, a need exists for such an airbag restraint module that provides for even inflation of the airbag cushion. Further, a need exists for such an airbag restraint module that can protect the cushion from heat damage during and after deployment. Still further, a need exists for an airbag module that can quickly deliver inflation fluid to the airbag without the need for complex channeling. Additionally, a need exists for an airbag restraint module that can accommodate the minimum width requirements due to front panel constraints on the vehicles dash board, while allowing for fast, even inflation. Such an novel airbag restraint module is disclosed and claimed herein.

BRIEF SUMMARY AND OBJECTS OF THE INVENTION

The present invention is directed to a novel vehicle occupant restraint or airbag restraint module. The module includes an inflation fluid source, or inflator. The module also includes an inflatable cushion having an inner surface and an outer surface. The cushion is configured to receive inflation fluid generated by the inflator. The inflation fluid source comprises a plurality of openings circumferentially spaced about an outer surface of the inflation fluid source through which inflation fluid is directed out of the inflation fluid source.

A retaining collar maybe positioned to retain the cushion in communication with the inflation fluid source. In one embodiment, the retaining collar includes a flange flaring elliptically outward from the inflation fluid source. In this configuration, the retaining collar creates a larger area for the inflation fluid to flow into the cushion, while conforming to the width limitations of the inflator imposed by dashboard constraints. The elliptically extending flange also provides quick inflation without complex channeling of the inflation fluid. Accordingly, the retaining collar of the present invention is simplified, smaller, and lighter weight in design and can provide even inflation to fully inflate an airbag cushion on the passenger side of the vehicle.

The retaining collar flange may also include an extended portion or tab that extends axially beyond a distal end of the inflation fluid source when the retaining collar is secured about the inflation fluid source. The tab prevents the inflation cushion from direct contact with the inflation fluid source. Thus, the cushion is protected from burning by coming into contact with the hot inflator. In one embodiment, an outer edge of the flange extends axially beyond the fluid source openings which also protects the cushion from direct contact by hot gases produced by the inflation fluid source.

The cushion may include a mouth for receiving inflation fluid. In one embodiment, the mouth is configured to fit about an outer surface of the inflator. The retaining collar is positioned adjacent the inner surface of the cushion at the mouth of the cushion and about the outer surface of the inflation fluid source, thus keeping the cushion in communication with the inflator upon inflation. The retaining collar may include positioning extensions configured to engage the cushion to prevent the cushion from movement relative to the retaining collar.

These and other advantages of the present invention will become more fully apparent by examination of the following description of the preferred embodiments and the accompanying drawings.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
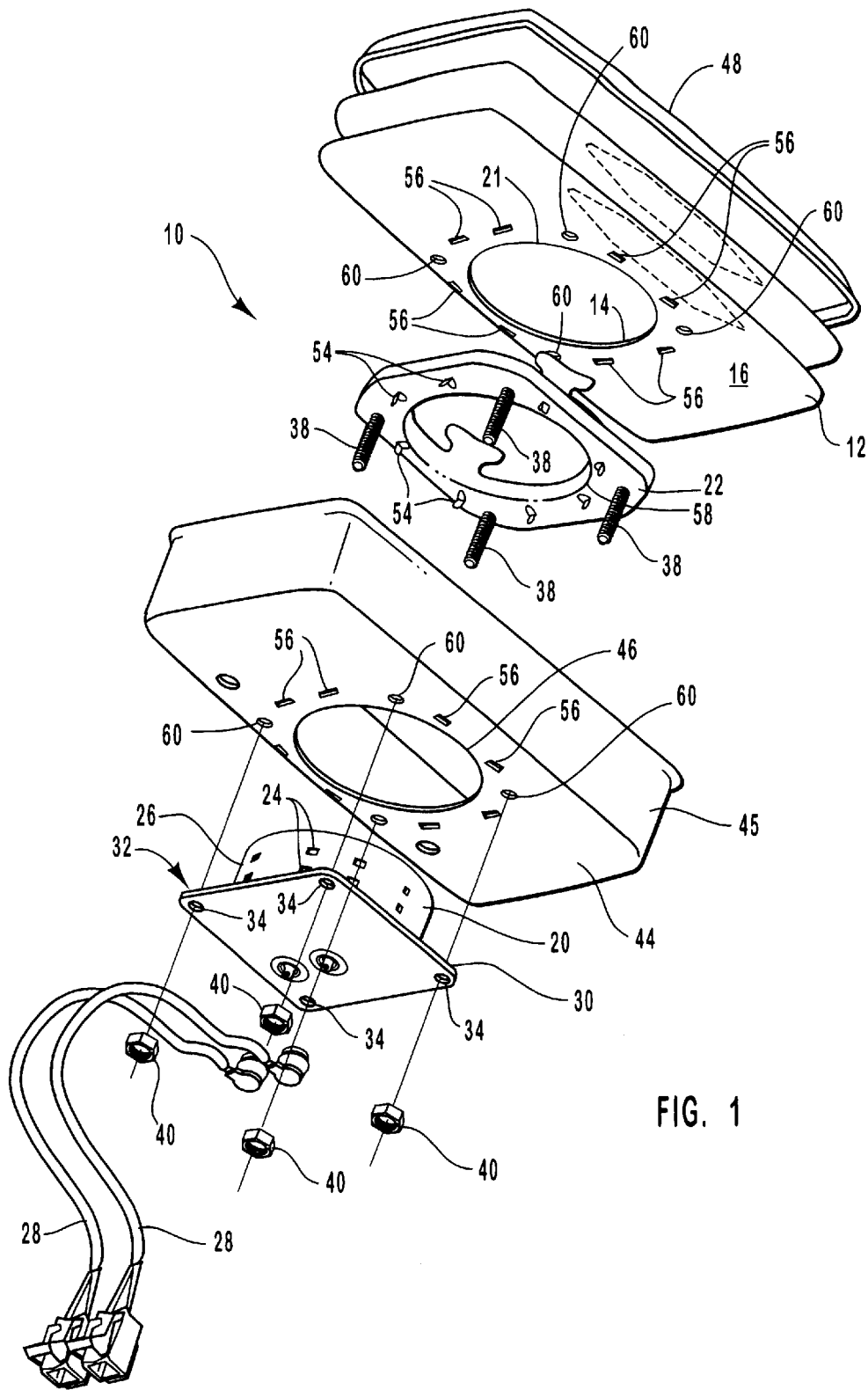
FIG. 1 is a exploded perspective view of the vehicle occupant restraint module of the present invention.

Reference is now made to the figures wherein like parts are referred to by like numerals throughout. With particular reference to FIG. 1, a vehicle occupant restraint module according to the present invention is generally designated at 10. The module 10 includes an inflatable cushion 12 having an inner surface 14 and an outer surface 16. The cushion 12 is capable of receiving inflation fluid 18 (see FIG. 3) from a inflation fluid source 20, or inflator 20. The cushion may include a mouth 21, configured to fit about the inflator 20, to facilitate receiving the inflation fluid 18. A retaining collar 22 is positioned adjacent the mouth 21 at the inner surface 14 of the cushion 12. The retaining collar 22 is secured about the inflator 20 to retain the inflatable cushion 12 in communication with the inflator 20.

The inflation fluid source or inflator 20 includes a plurality of openings 24 circumferentially spaced about an outer surface 26 of the inflation fluid source 20 through which the inflation fluid 18 is directed out of the inflator 20. The inflator 20 is a pyrotechnic assembly in which a measured quantity of generant (not shown), or pyrotechnic material, is stored. The inflator 20 includes means for activating the gas generant (not shown) which in a preferred embodiment are a pair of connector leads 28. An initiator such as an accelerometer (not shown) detects improper deceleration which sends an electric signal through the connector leads 28 into the inflator 20. This signal triggers a reaction within the inflator 20 which produces the inflation fluid 18 for inflating the cushion 12.

The inflator 20 includes a flange member 30. The flange member 30 may include a clamping surface 32 to facilitate capturing the cushion 12 between the retaining collar 22 and the flange member 30. The flange member 30 also includes orifices 34 configured to received a plurality of posts 38 attached to the retaining collar 22. As will be discussed in greater detail below, the posts 38 and orifices 34 facilitate the clamping function of the retaining collar 22, which keeps the cushion 12, and other parts of the module 10 in their proper configuration with the mouth 21 of the cushion 12 about the inflator 22. Attachment means known in the art may be secured to the posts 38. In a preferred embodiment, there are four posts 38 threaded to receive corresponding nuts 40.

The restraint module 10 may also include a mounting base member 44 to which the cushion 12 is attached. In a presently preferred embodiment, the mounting base member 44 is part of a housing 45 for retaining the inflatable cushion 12 in a folded state. The housing 45 may include an opening 46 configured to substantially match the shape of the outer surface 26 of the inflator 20, which is preferably cylindrical. In the embodiment illustrated in FIG. 1, the housing 45 is clamped, along with the mouth 21 of the cushion 12, between the retaining collar 22 and the flange member 30 of the inflator 20. The housing 45 may also include a lid member 48 which can be secured about the housing 45 once the folded cushion 12 is folded within the housing 45. In other embodiments, the lid member 48 may be integral with the housing 45.

The retaining collar 20 is positioned adjacent the inner surface 14 of the cushion 12 at the mouth 21 and about the outer surface 26 of the inflation fluid source 20. It will be appreciated that the circular shape mouth 21 is configured to closely approximate the outer surface 26 of the inflator 20 which is cylindrical. The outer surface 26 of the inflator 20 may be configured in a number configurations to provide even inflation of the cushion 12 and consequently, the corresponding configuration of the mouth 21 may also be one of a number of configurations.

The retaining collar 20 may include positioning extensions 54 configured to engage corresponding openings 56 within the cushion 12 and the housing 45. The openings 56 in the cushion 12 are adjacent to, and spaced about, the mouth 21 and when the retaining collar 20 is secured to the inflator 20, with the extensions 54 seated within the openings 56, the cushion 12 is prevented from movement relative to the retaining collar 20 and the inflator 20. In embodiments where the positioning extensions 54 are positioned within the housing 45, the cushion 12 is also prevented from movement relative to the housing 45. The spaced apart extensions 54 and openings 56 also allow for more uniform retention by the retaining collar 22. In this configuration, there are less possible gaps for the inflation fluid to escape to the outside surface 16 of the cushion 12, rather than directly into the cushion 12.

In one presently preferred embodiment, the positioning extensions 54 are punched out of, and integral with, the material of the retaining collar 22. In other embodiments, the positioning extensions 54 may be separate members attached to the retaining collar 22. The extensions may also be dimples or other types of indentions that impinge upon the fabric of the cushion 12. In these alternative embodiments, positioning extensions 54 need not be broken away from, or punched through the retaining collar 22, thus obviating the need for openings 56 to receive the extensions 54.

The posts 38 of the retaining collar 22 may be integral with the retaining collar 22 or may be separate pieces attached to the retaining collar 22 by means known in the art, including welding, swaging, press fitting, bonding with suitable materials, and the like. The posts 38 may be positioned in any number of configurations to secure the curtain 12 to the inflation fluid source 20. In a presently preferred embodiment, four posts 38 are equally spaced adjacent a circular retaining collar opening 58 which corresponds to the configuration of the mouth 21. The posts 38 correspond to, and fit within, post openings 60 within the cushion 12 and the housing 45 to secure the restraint module 10 together.

Figure 2:
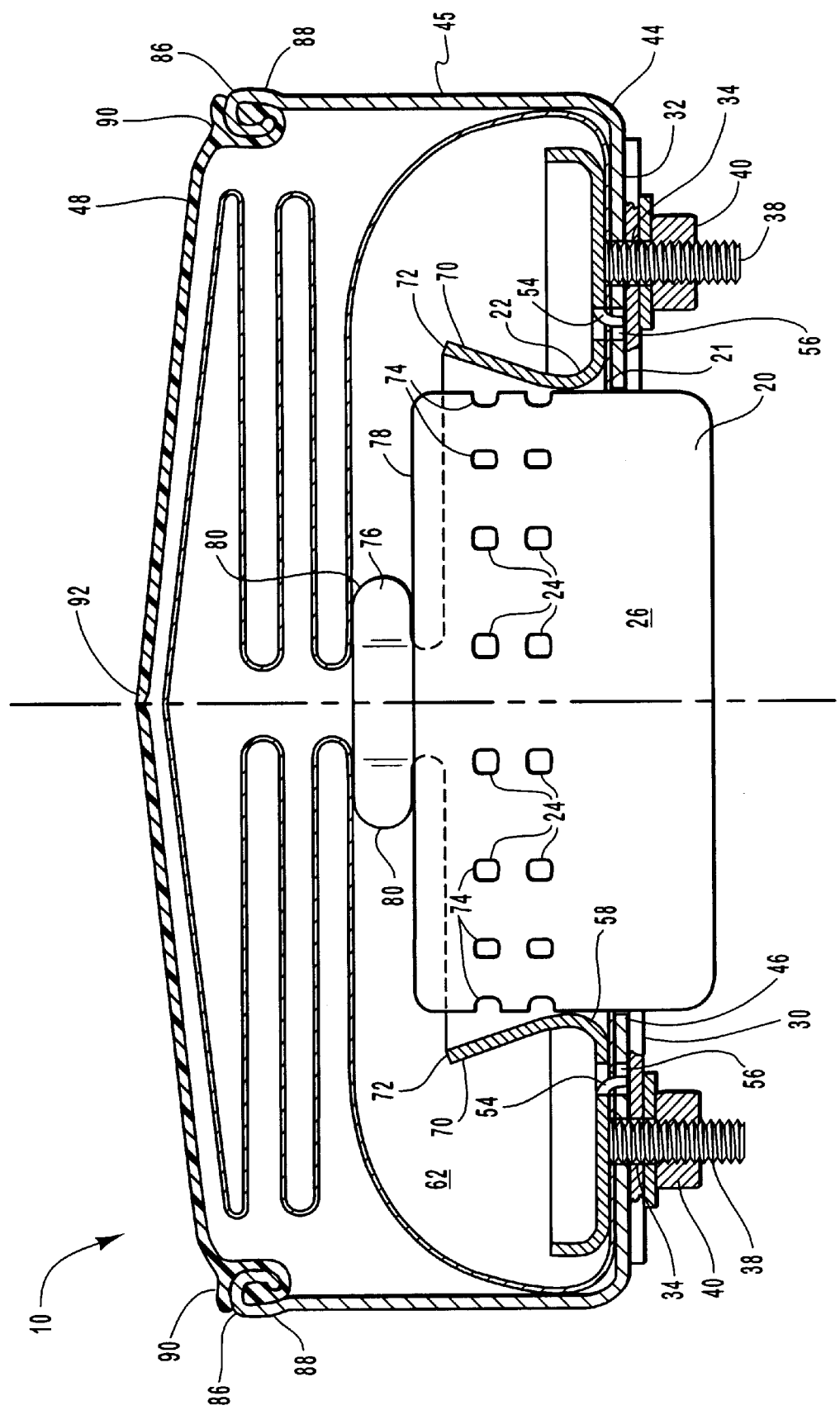
FIG. 2 is a side plan cutaway view of the vehicle occupant restraint module of FIG. 1 with the cushion in a folded state.
Figure 3:
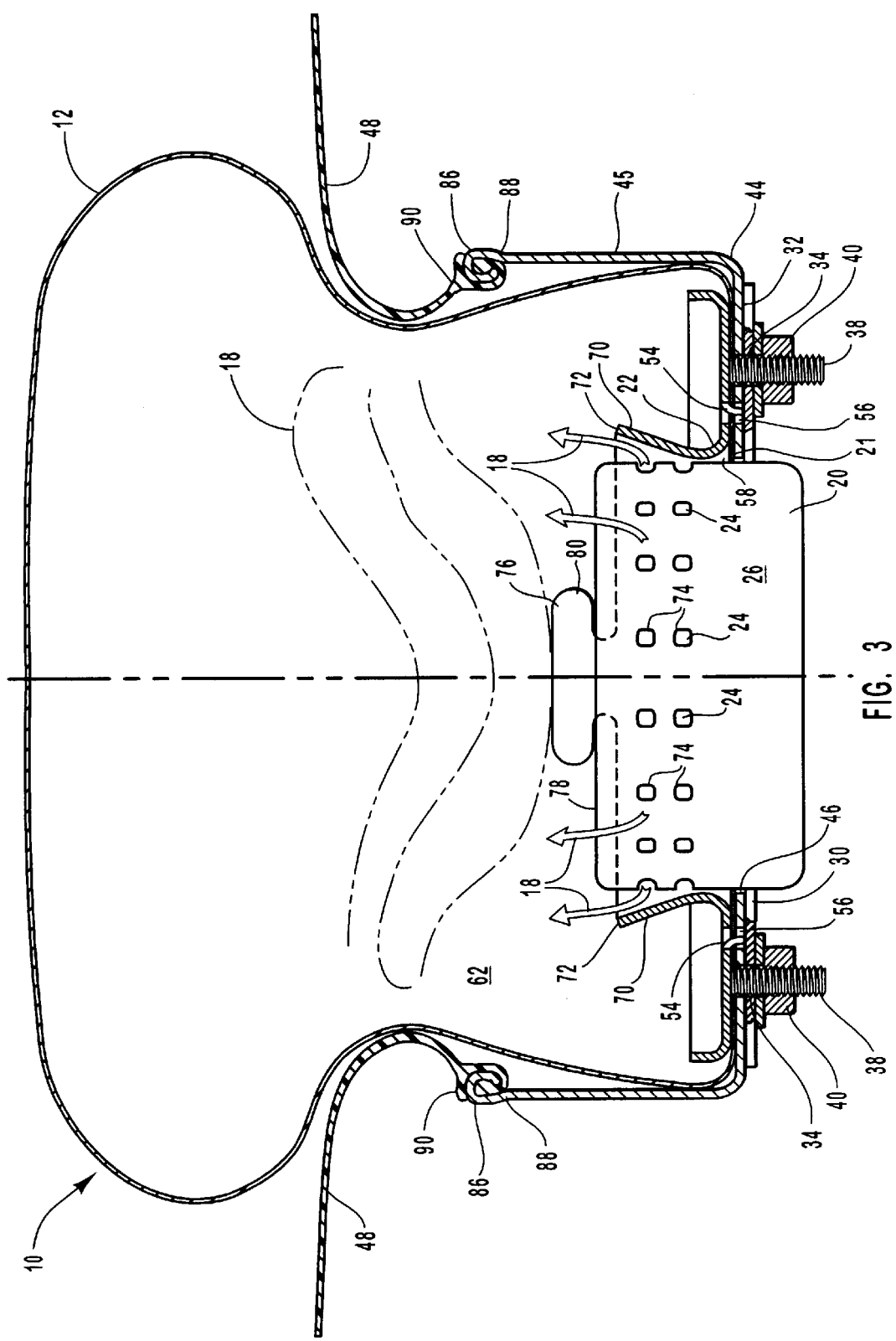
FIG. 3 is a side plan cutaway view of the vehicle occupant restraint module of FIG. 1 with the cushion in a inflated state.

Referring now to FIGS. 2 and 3, the orifices 34 in the flange member 30 align with the post openings 60 in the cushion 12 and housing 45 to receive the posts 38 and clamp the curtain 12 to a position axially below the openings 24 of the inflator 20. In this configuration, the openings 24 direct air into an interior 62 of the cushion 12.

The retaining collar 22 is positioned adjacent the inner surface 14 of the cushion 12 at the mouth 21 and about the outer surface 26 of the inflation fluid source 20. It will be appreciated that the circular shape mouth 21 is configured to closely approximate the outer surface 26 of the inflator 20 which is cylindrical. The outer surface 26 of the inflator 20 may be configured in a number of configurations to provide even inflation of the cushion 12 and consequently, the corresponding configuration of the mouth 21 may also be one of a number of configurations.

The retaining collar 22 may include positioning extensions 54 configured to engage corresponding openings 56 within the cushion 12 and the housing 45. The openings 56 in the cushion 12 are adjacent to, and spaced about, the mouth 21 and when the retaining collar 22 is secured to the inflator 20, with the extensions 54 seated within the openings 56, the cushion 12 is prevented from movement relative to the retaining collar 22 and the inflator 20. In embodiments where the positioning extensions 54 are positioned within the housing 45, the cushion 12 is also prevented from movement relative to the housing 45. The spaced apart extensions 54 and openings 56 also allow for more uniform retention by the retaining collar 22. In this configuration, there are less possible gaps for the inflation fluid to escape to the outside surface 16 of the cushion 12, rather than directly into the cushion 12.

The retaining collar 22 may also include an extended portion 76 that extends axially beyond a distal end 78 of the inflation fluid source 20 when the retaining collar 22 is secured about the inflation fluid source 20. As can be seen in FIGS. 2 and 3, the extended portion keeps some or all of the inflation cushion 12 from direct contact with the inflation fluid source 20. The inflator surface 26 becomes very hot as inflation fluid 18 is produced. The extended portion 76 prevents the cushion 12 from resting on the inflator 20 and possibly burning or creating smoke or harmful fumes which could be dangerous to a passenger within the vehicle.

In a presently preferred embodiment, the extended portion 76 is a pair of T-shaped tabs 76. The tabs may each be configured with wings 80. The tabs 76 assist in the assembly of the restraint device 10. When the inflator 20 is inserted into mouth 21 of the cushion 12, the inflator 20 will tend to push the cushion 12 away because the distal end 78 of the inflator 20 is axially above the outer edge 72 of the flange 70 which is positioned within the cushion. This can make it difficult to secure the retaining collar 22 to the inflator 20. However, the tabs 76 allow the inflator 20 to slide into proper position before contacting the folded cushion 12. Thus, the inflator 20 will not push the cushion 12 away during assembly and the retainer collar can easily be attached about the inflator 20.

The inflator 20 is preferably disk-shaped. It may weigh between about 0.5 and about 3.5 kg. In a presently preferred embodiment, it weighs about 1 kg. The inflator 20 is capable of delivering at least 80 liters of inflation fluid, or put another way, inflating at least an 80 liter cushion 12. In a preferred embodiment, the inflator 20 is capable of providing 170 liters of inflation fluid in a very short amount of time. Those of skill in the art will appreciate that this can fill larger size airbag cushions 12 which are necessary on the passenger side of the vehicle because there is more volume to fill, owing to the lack of a steering wheel column on the passenger side. Accordingly, only one inflator 20 is needed to fill a cushion 12 on the passenger side of the vehicle.

The housing 45 maybe configured in variety of ways to practice the teachings of this invention. In a presently preferred embodiment, the housing 45 is rectangularly shaped to conform to the configuration of the cushion 12 in a folded state. The lid member 48 is attached to the housing 45 by means of a hinge 86. The housing member 45 and lid member 48 are preferably injection molded with a heat resistant polymer. The an outer edge 88 of the housing 45 and outer edge 90 of the lid member 48 are molded to interact with each other forming the rotational hinge 86. The outer edges 88, 90 of the housing 45 and lid member 48 may be integral with one another and the hinge 86 may constitute a pre-folded crease in the housing 45 material. The lid member 48 includes a scored portion 92 (FIG. 2), to facilitate the breakthrough of the cushion 12 upon inflation to a predetermined pressure.

Figure 4:
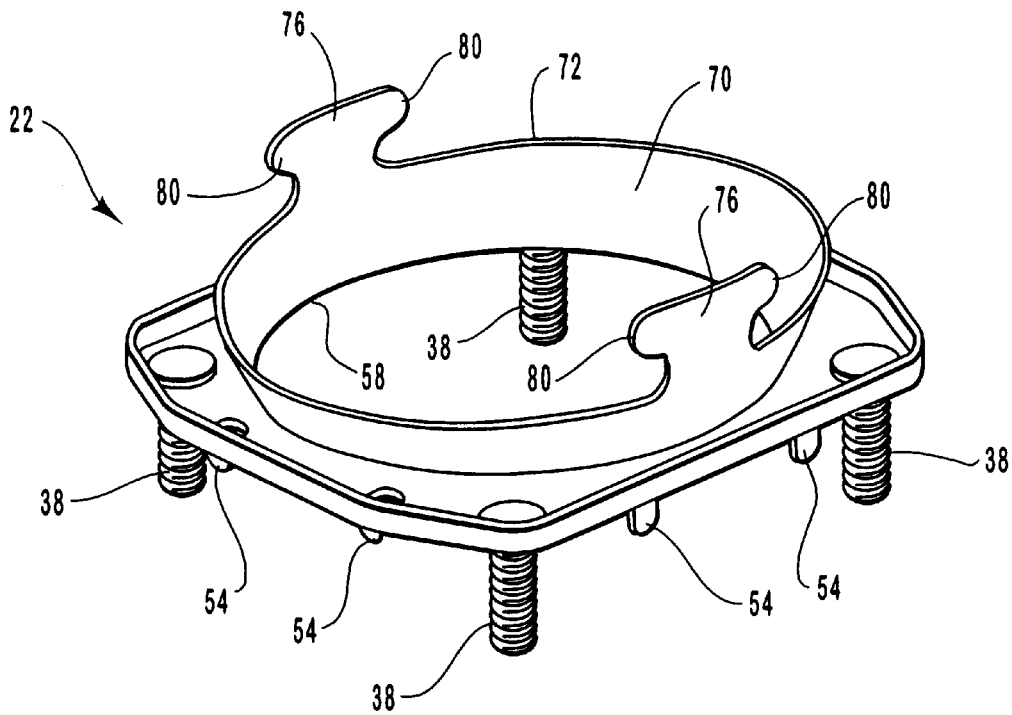
FIG. 4 is a perspective view of a retaining collar of the vehicle occupant restraint module of FIG. 1.
Figure 5:
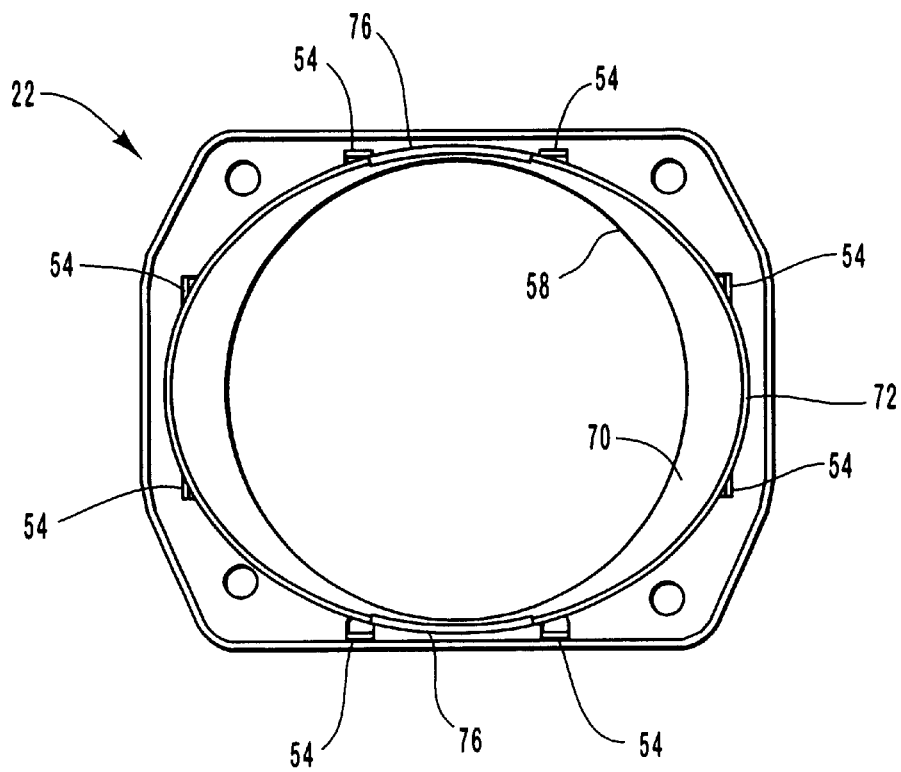
FIG. 5 is a top plan view of the retaining collar of FIG. 4.

Referring now to FIGS. 4 and 5, the retaining collar 22 of the preferred invention 10 is illustrated. In one embodiment, a portion of the flange 70 is flared outwardly away from the inflator 20. In a presently preferred embodiment, all of the flange 70 of the retaining collar 22 flares outwardly and elliptically away from the inflator 20. The outer edge 72 of the flange 70 is positioned within the mouth 21 of the cushion 12. In this configuration, the elliptically outward flare of the flange 70 gives the restraint device 10 a larger opening at the point of entry of the inflation fluid 18 into the cushion 12, while maintaining the overall size of the inflator 20 and retaining collar 22. Accordingly, The integral nature of the retaining collar 22 allows for a simplified, smaller and lighter weight retaining collar 22 that is cheaper to manufacture. It is also easier to produce tooling for manufacture and lends itself to a standardized tooling and assembly process. In one embodiment, the retaining collar 22 is made of metal. In other embodiments, the retaining collar 22 many be made of aluminum, ceramic, composite materials, polymers and the like, that can meet predetermined heat tolerances.

It should be appreciated that the apparatus of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vehicle occupant restraint module, comprising:
   an inflatable cushion having an inner surface and an outer surface, the inflatable cushion being capable of receiving inflation fluid;
   an inflation fluid source in communication with the inflatable cushion; and
   a retaining collar positioned to retain the inflatable cushion in communication with the inflation fluid source, the retaining collar having a flange, at least a portion of said flange flares outwardly and elliptically away from the inflation fluid source.

2. The module of claim 1, wherein the entire flange flares outwardly and elliptically away from the inflation fluid source.

3. The module of claim 1, wherein the retaining collar comprises an extended portion extending axially beyond a distal end of the inflation fluid source when the retaining collar is secured about the inflation fluid source, thereby preventing a portion of the inflatable cushion from direct contact with the inflation fluid source.

4. The module of claim 3, wherein the extended portion comprises at least one T-shaped tab.

5. The module of claim 1, where in the inflation fluid source produces at least about 80 liters of inflation fluid volume.

6. The module of claim 5, wherein the inflation fluid source produces at least about 130 liters of inflation fluid volume.

7. The module of claim 1, wherein the cushion has a mouth for receiving inflation fluid.

8. The module of claim 1, wherein the retaining collar comprises positioning extensions configured to engage the cushion to thereby prevent the cushion from movement relative to the retaining collar.

9. The module of claim 1, wherein the inflation fluid source comprises a plurality of openings circumferentially spaced about an outer surface of the inflation fluid source through which inflation fluid is directed out of the inflation fluid source.

10. The module of claim 9, wherein an outer edge of the flange extends axially beyond the fluid source openings thereby deflecting a portion of the inflation fluid as it exits the inflation fluid source.

11. The module of claim 1, further comprising a mounting base member to which the cushion is attached.

12. The module of claim 11, wherein the mounting base member is part of a housing for retaining the inflatable cushion in a folded state.

13. The module of claim 1, wherein the inflation fluid source weighs between about one half of a kilogram and about three and half kilograms.

14. The module of claim 13, wherein the inflation fluid source weighs about 1 kilogram.

15. The module of claim 1, wherein the retaining collar is positioned adjacent the inner surface of the cushion about an outer surface of the inflation fluid source.

16. A retaining collar for retaining an inflatable cushion in communication with an inflation fluid source, the retaining collar comprising:
  a base member defining an opening;
  an annular member extending outwardly from the base member, said annular member having an extended portion extending axially beyond a distal end of the inflation fluid source when the retaining collar is secured about the inflation fluid source, said annular member flaring outwardly and elliptically away from the opening; and
  positioning extensions configured within the bases member to engage the cushion to thereby prevent the cushion from movement relative to the retaining collar.

17. A vehicle occupant restraint module, comprising:
  an inflatable cushion having an inner surface and an outer surface, capable of receiving inflation fluid;
  an inflation fluid source in communication with the inflatable cushion; and
  a retaining collar positioned about the inflation fluid source to retain the inflatable cushion in communication with the inflation fluid source, the retaining collar having an extended portion comprising at least one T-shaped tab, the extended portion extending axially beyond the top of the inflation fluid source when the retaining collar is secured about the inflation fluid source, thereby preventing a portion of the inflatable cushion from direct contact with the inflation fluid source.

18. The module of claim 17, wherein the retaining collar is positioned to retain the inflatable cushion in communication with the inflation fluid source, the retaining collar having a flange, at least a portion of said flange flares outwardly away from the inflation fluid source.

19. The module of claim 18, wherein the entire flange flares outwardly away from the inflation fluid source.

20. The module of claim 18, wherein the flange flares outwardly and elliptically away from the inflation fluid source.

21. The module of claim 18, wherein the inflation fluid source comprises a plurality of openings circumferentially spaced about an outer surface of the inflation fluid source through which inflation fluid is directed out of the inflation fluid source.

22. The module of claim 21, wherein an outer edge of the flange extends axially beyond the fluid source openings thereby deflecting the inflation fluid as it exits the inflation fluid source.

23. The module of claim 17, wherein the cushion has a mouth for receiving inflation fluid.

24. The module of claim 23, wherein the retaining collar is positioned adjacent the inner surface of the cushion at the mouth and about an outer surface of the inflation fluid source.

25. The module of claim 24, wherein the retaining collar comprises positioning extensions configured to engage openings adjacent the mouth of the cushion to thereby prevent the cushion from movement relative to the retaining collar.

26. The module of claim 17, further comprising a mounting base member to which the cushion is attached.

27. The module of claim 26, wherein the mounting base member is part of a housing for retaining the inflatable cushion in a folded state.

28. The module of claim 17, wherein the inflation fluid source weighs between about one half of a kilogram and about three and half kilograms.

29. The module of claim 28, wherein the inflation fluid source weighs about 1 kilogram.

30. The module of claim 17, where in the inflation fluid source produces at least about 80 liters of inflation fluid volume.

31. The module of claim 30, wherein the inflation fluid source produces at least about 130 liters of inflation fluid volume.

32. A vehicle occupant restraint module, comprising:
  an inflatable cushion having an inner surface and an outer surface, capable of receiving inflation fluid;
  an inflation fluid source in communication with the inflatable cushion;
  a retaining collar positioned to retain the inflatable cushion in communication with the inflation fluid source, the retaining collar having a flange flaring elliptically outward from the inflation fluid source, the retaining collar having an extended portion extending axially beyond a distal end of the inflation fluid source when the retaining collar is secured about the inflation fluid source, thereby preventing a portion of the inflatable cushion from direct contact with the inflation fluid source.

33. The module of claim 32, wherein the retaining collar comprises positioning extensions configured to engage openings adjacent an inlet opening of the cushion to thereby prevent the cushion from movement relative to the retaining collar.

34. The module of claim 33, where in the inflation fluid source produces at least about 80 liters of inflation fluid volume.

35. The module claim 34, wherein the inflation fluid source produces at least about 130 liters of inflation fluid volume.

36. A retaining collar for retaining an inflatable cushion in communication with an inflation fluid source, the retaining collar comprising:

a base member defining an opening; and an annular member extending outwardly from the base member, said annular member having an extended portion extending axially beyond a distal end of the inflation fluid source when the retaining collar is secured about the inflation fluid source, wherein at least a portion of the annular member flares outwardly and elliptically away from the opening.

37. The collar of claim 36, wherein the annular member extends axially beyond openings in the fluid source to thereby deflecting the inflation fluid as it exits the inflation fluid source.

38. The collar of claim 36, wherein the entire annular member flares outwardly away from the opening.

39. The collar of claim 36, further comprising positioning extensions configured to engage the cushion to thereby prevent the cushion from movement relative to the retaining collar.

40. The collar of claim 36, further comprising a clamping surface for securing the collar to the fluid inflation source.

41. The collar of claim 36, wherein the base member defines a substantially circular opening.

42. A vehicle occupant restraint module, comprising:

an inflatable cushion having an inner surface and an outer surface, the inflatable cushion being capable of receiving inflation fluid;

an inflation fluid source in communication with the inflatable cushion; and a retaining collar positioned to retain the inflatable cushion in communication with the inflation fluid source, the retaining collar having an extended portion extending axially beyond a distal end of the inflation fluid source when the retaining collar is secured about the inflation fluid source, thereby preventing a portion of the inflation cushion from direct contact with the inflation fluid source, the extended portion comprising at least one T-shaped tab, the retaining collar further comprising a flange, wherein at least a portion of said flange flares outwardly away from the inflation fluid source.

43. The module of claim 42, wherein the entire flange flares outwardly away from the inflation fluid source.

44. The module of claim 42, wherein the flange flares outwardly and elliptically away from the inflation fluid source.

45. The module of claim 42, wherein the retaining collar comprises positioning extensions configured to engage the cushion to thereby prevent the cushion from movement relative to the retaining collar.

46. The module of claim 42, wherein the inflation fluid source comprises a plurality of openings circumferentially spaced about an outer surface of the inflation fluid source through which inflation fluid is directed out of the inflation fluid source.

47. The module of claim 46, wherein an outer edge of the flange extends axially beyond the fluid source openings thereby deflecting a portion of the inflation fluid as it exits the inflation fluid source.

* * * * *